United States Patent [19]

Dickerson

[11] 4,002,950

[45] Jan. 11, 1977

[54] POWER TRANSMISSION CONTROL SYSTEM

[75] Inventor: Arthur F. Dickerson, Woodland Hills, Calif.

[73] Assignee: Hughes Aircraft Company, Culver City, Calif.

[22] Filed: Mar. 6, 1975

[21] Appl. No.: 555,770

[52] U.S. Cl. .................................. 317/16; 317/20
[51] Int. Cl.² ........................................ H02H 3/20
[58] Field of Search ................... 317/11 C, 16, 20

[56] References Cited

UNITED STATES PATENTS

| | | | |
|---|---|---|---|
| 3,611,040 | 10/1971 | Ainsworth | 317/20 |
| 3,873,887 | 3/1975 | Barkan et al. | 317/20 |

OTHER PUBLICATIONS

B488,634, published Jan. 20, 1976, filed July 15, 1974.

*Primary Examiner*—Harry Moose
*Attorney, Agent, or Firm*—Richard J. Rengel; Allen A. Dicke; William H. MacAllister

[57] ABSTRACT

The ac transmission system is protected by circuit breaker apparatus capable of responding to fault current levels exceeding a predetermined critical fault level, but less than the maximum fault current. The fault current levels exceeding the critical level are detected by comparison of actual line current to a simulation of the critical level of fault current for one of a plurality of phases ∅1, ∅2, ∅3. Reference signals in quadrature with the three line voltages are continuously fed to differential amplifiers having both inputs connected in parallel until a potential fault is detected when one input is disconnected and clamped at the potential it had at the time of disconnect. The resulting output of the differential amplifiers accurately simulates the time-varying current of a system fault. The simulated signals are compared to actual line current to determine in less than one cycle if a fault is occurring and to order the appropriate breaker action.

10 Claims, 9 Drawing Figures

POWER TRANSMISSION CONTROL SYSTEM

BACKGROUND OF THE INVENTION

The field of the invention is fault sensing and control of power distribution systems. More particularly, the preferred embodiment of the present invention is directed to reducing the time period of fault sensing and control of impedance insertion or simply circuit breaker operation interrupting power transmission, i.e. to provide for interruption of power transmission in the faulted line or lines before fault currents reach unmanageable or destructive amplitudes.

In some power distribution systems, the short circuit current capability has steadily grown to the point that existing station equipment, in particular the circuit breaker is marginal or inadequate in its fault current ratings. The cause of this trend is primarily the continuing increase in power consumption per unit area. However, the problem is compounded by the requirements of system security which have prompted stiff ties to neighboring systems and multiple parallel transmission lines within each system. There are a number of convincing arguments that the growth in short circuit capability occurs at a geometric rate. This factor combined with increased installation costs and lengthened lead times for procurement of new equipment present a strong case for current limiting devices as an alternative to the historic approach of replacement and upgrating of breakers as their ratings are surpassed.

Various devices have been utilized to limit fault current duty. These include resonant L-C links, saturable reactors and at low voltages, static breakers using forcecommutated thyristors. The above devices have individual advantages and disadvantages, but all share in common the disadvantage of significant power losses while operating with normal load. In addition, these arrangements utilizing reactive elements tend to be quite bulky and introduce to the system additional problems from transient over-voltages or harmonic currents.

The insertion during the fault of a resistive element in series with a bus or feeder has certain attractive advantages, but requires rapid response and sophisticated sensing and control. In order to be effective, the device should be capable of inserting the current limiting resistor into the transmission line within about one millisecond of the occurrence of the fault. Further, owing to the extensive interconnection common within many systems, operation at transmission voltages, 138 kV and higher, is desirable.

Until recently, devices were not available which were capable of both rapid response and operation at sufficiently high voltage to make current limiting by resistor insertion in transmission lines practical. During the past year, tests have demonstrated the practicality of interrupting high voltage direct current (HVDC) lines at the 100 kilovolt (kV), 1 kiloampere (kA) level in times as short as two milliseconds. Tests on improved models of this apparatus have been carried forward to 5 kA, still retaining the 100 kV modular unit size. In addition, opening times as short as 1 millisecond have been achieved on prototype mechanical switches suitable to the current and voltage levels required. Power distribution systems providing current limiting by resistor insertion of the preferred type are disclosed in U.S. Pat. Nos. 3,611,031, 3,641,358, 3,660,723, 3,657,607, 3,777,179, 3,781,606, and Re. 27,557 having a common assignee and are incorporated herein by reference; and preferred current interrupters of the crossed-field switch tube type can be turned off without requiring a natural current zero and thereby can transfer the current into a parallel resistor are cited infra.

Resistor insertion type ac current limiting devices rated for 138 kV, 10 kA interrupt capacity and based upon the foregoing breaker are disclosed in copending application of Wolfgang Knauer and William L. Dugan, U.S. Pat. No. 3,912,975, entitled "Impedance-Increasing System and In Line Device Therefor" of the common assignee and incorporated herein by reference.

Prior methods of fault sensing, e.g. measuring rms value of the fault current, require a long sensing period including several periods of an alternating current (ac) cycle which is on the order of tens of milliseconds (ms). The prior methods are suitable for conventional circuit breakers that require at least two cycles for contact opening and arc interruption of the breaker.

In the prior method of fault sensing, the circuit breaker is tripped when the measured rms value exceeds a predetermined critical level. Obviously, sensing in a shorter time period than the time interval of an ac cycle cannot be accomplished directly and the rms value must be inferred by projection of an initial fault current build-up. A further complication in this procedure of projection is that faults can start at any time within the ac cycle.

Recent developments in electrical power breakers include one-cycle and synchronous breakers and also current limiting breakers. These recently developed breakers are dependent upon very short time intervals for fault sensing to utilize their improved capabilities, i.e. sensing time intervals of less than a millisecond to a few milliseconds.

The control system is directed to a system which senses power system conditions and when a power fault is detected in an aligned sample signal related to the aligned divisions a network simulator is activated to generate a simulated fault condition in phase with the line fault. The simulated fault current provides a reference and both simulated reference fault current and sampled fault current are supplied to a differential comparator for comparison and response when appropriate.

Accordingly, an object of the present invention is to provide for improved control of ac power distribution for interrupting faulted power lines.

Another object is the provision of method and apparatus for rapid fault current sensing and control of fast-acting circuit breaker.

A further object is to provide for improved simulation of fault conditions in power transmission.

Other objects and features of the invention will become apparant to those skilled in the art as disclosure is made in the following detailed description of preferred embodiments of the invention.

DETAILED DESCRIPTION OF THE PREFERRED EMBODIMENT

Figure 1:
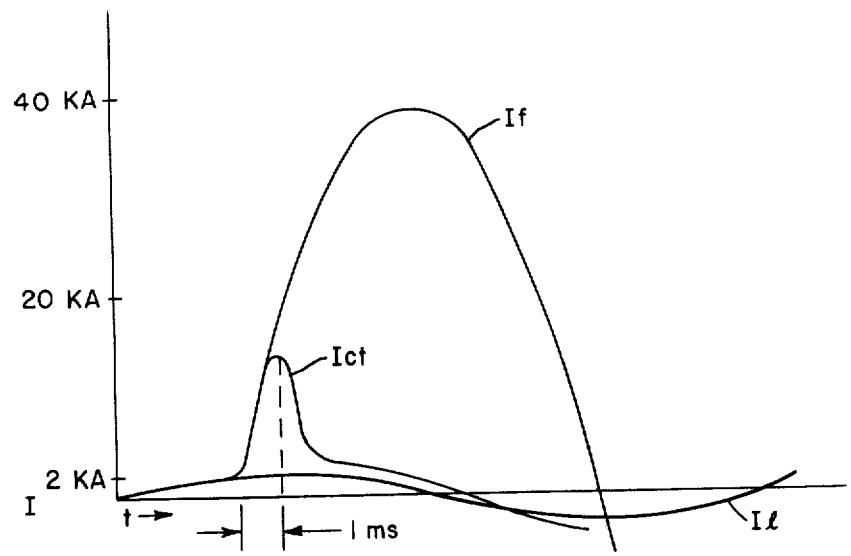
FIG. 1 is a graph for illustrating typical load current, fault current, and current interruption of the preferred embodiment as provided by the present invention.
Figure 3A:
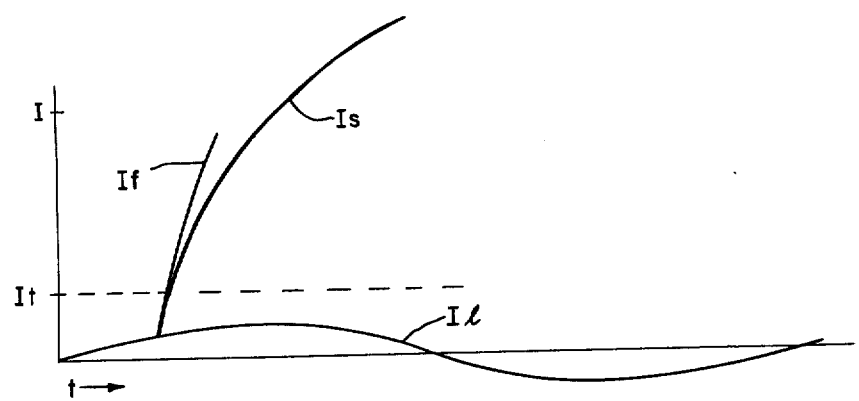
FIG. 3a is a graph showing typical currents including actual fault current, projected, simulated fault current and load current and the current threshold level which is the critical level for initiating a current limiting operating cycle of the present invention.

Referring now to the drawings, wherein like reference characters refer to corresponding parts throughout the several views there is shown in FIG. 1, a timing diagram showing a typical load current for a power distribution system, for example, a distribution system including two bus-ties which are supplied by separate generators supplying transmission lines through conventional circuit breakers. A typical short circuit current illustrated for such an arrangement can reach 40 kiloamperes (kA) for a symmetrical fault as compared to 2 kA of normal load current. Interruption of short circuit currents before they reach 10 kA requires early detection for switching within a millisecond as provided by the present invention. The switching operation includes opening of an inline breaker, e.g. breaker 10, in the current limiting circuit shown in FIG. 2 and transferring the short circuit current to a crossed-field switch tube 18 or interruptor which is subsequently turned-off to pass the current through a parallel current limiting impedance element, e.g. resistor 22, in the current limiting circuit 12. Once the current limiting impedance 22 is inserted, the subsequent current level is low as illustrated in FIG. 2a, permitting the fault to be cleared, at a current well within the capability of conventional circuit breakers.

Figure 2:
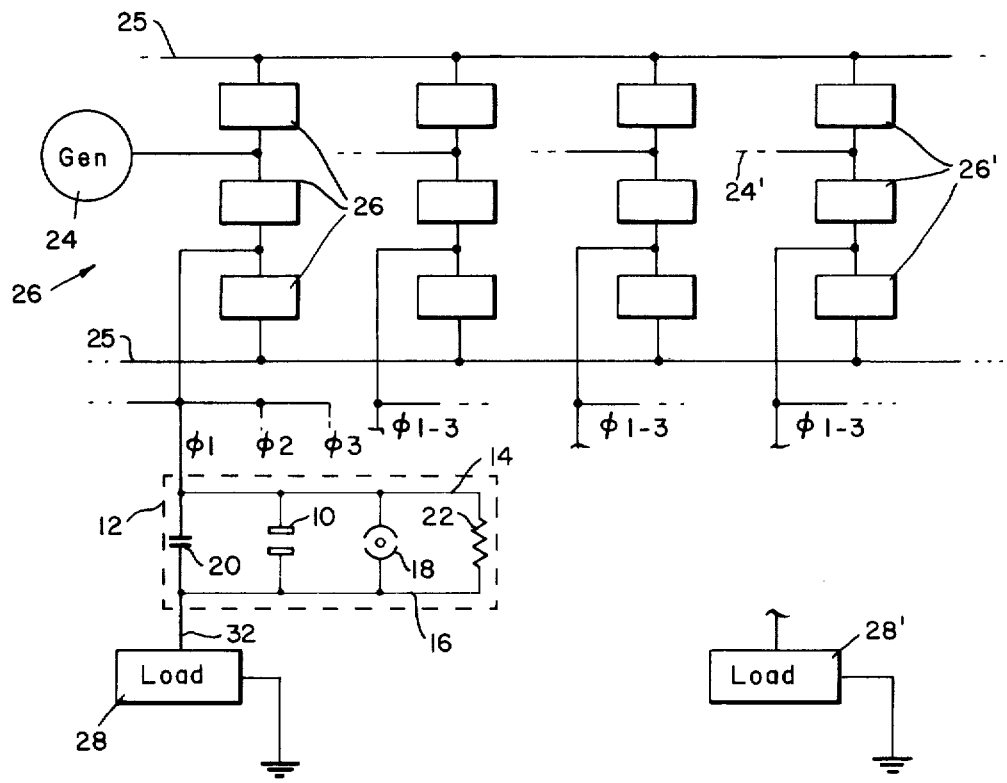
FIG. 2 is a circuit block diagram of a typical power distribution system including a preferred current limiting circuit arrangement.
Figure 2A:
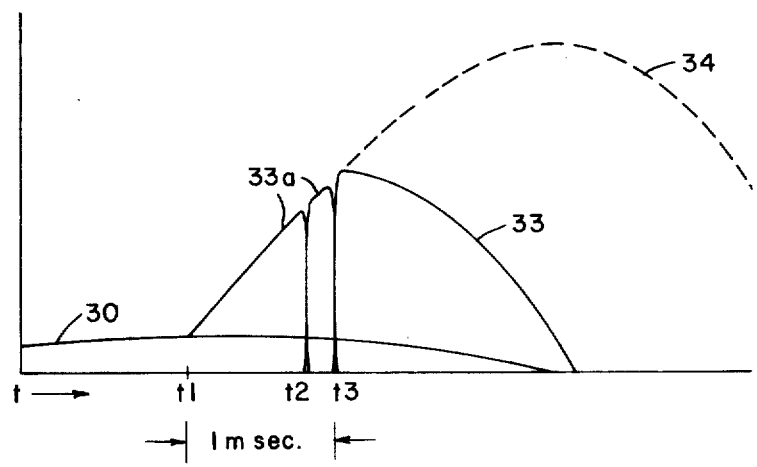
FIG. 2a illustrates the operation of the current limiting device shown in FIG. 2 by a timing diagram having corresponding waveforms of load, fault and impedance limited fault currents.

A typical power distribution system for one phase of the current limiting circuit is shown in FIG. 2. The current limiter circuit 12 provides for insertion of impedance 22 into the single phase bus of the ac power distribution system to limit fault current. The value of the impedance reduces the current to a low level to permit the fault to be cleared by opening of the conventional station circuit breakers 26. Until recent developments, devices were not available which were capable of both rapid response and operation at sufficiently high voltage and current to make current-limiting by impedance insertion practical in transmission line applications.

Current limiter circuit 12 comprises three major circuit elements connected in parallel between lines 14 and 16 bypassing capacitor 20. Crossed-field switch device 18 is a cold cathode, glow discharge tube which requires for its conduction an externally applied magnetic field. When this field is turned off, the current between the main electrodes falls to zero in a few microseconds. The interelectrode gap has vacuum insulation properties and easily withstands high voltage. Particular examples of crossed-field switch devices are shown in U.S. Pat. No. 3,638,061 of M. A. Lutz and R. C. Knechtli; U.S. Pat. No. 3,641,384 of R. E. Lund and G. A. G. Hofmann; U.S. Pat. Nos. 3,604,977; 3,769,537 of G. A. G. Hofmann; U.S. Pat. No. 3,558,960, G. A. G. Hofmann and R. C. Knechtli; and U.S. Pat. No. 3,678,289 of M. A. Lutz and G. A. G. Hofmann, and are incorporated herein by reference.

Capacitor 20 provides for limiting the rate of voltage rise during resistor insertion. Impedance 22 preferably takes the form of a resistor which consists of Thyrite blocks. These blocks have a nonlinear resistance characteristic of increasing resistance with decreasing current. The nonlinear characteristics of such resistors permit them to reduce the current to normal levels while minimizing the initial voltage surges due to resistor insertion. It is important to sense the fault as early as possible to provide for early resistor insertion.

In operation of a typical one of current limiter circuits 12, switch 10 is normally closed and load current is supplied from generator 24 through the conventional station breakers 26, in-line limiter circuit 12 to load 28. Normal current is indicated by curve 30 in FIG. 2. When a fault is detected, switch 10 is opened at $t1$ and draws an arc across the contacts thereof. Crossed-field switch device 18 is turned on at time $t2$ to permit quenching and deionization of the arc between contacts of switch 10 in the millisecond time period $t1-t3$. Thereupon, the crossed-field switch 18 is turned-off at time $t3$ and resistor 22 is inserted to minimize the fault current on line 32, as shown by resistor limited fault current 33 (FIG. 2a) rather than the unrestricted fault current 34. The curve indicating the limited fault current 33 is well within the current handling capacity of the normal system circuit breakers 26.

It is well known that the current flowing as a result of a high level fault is in quadrature with the generator voltage and contains a direct current (or low frequency component) called the "offset" which is determined by the time during the generator cycle at which the fault occurs. That is, if the fault occurs at the instant when generator voltage is zero, the offset will be a maximum and conversely the offset will be zero for faults occurring at the instant of maximum generator voltage. The polarity of the offset will be negative for cases of negative-going generator voltage and positive for positive-going voltage, regardless of the instantaneous polarity of the voltage.

The mathematical analysis of the foregoing is briefly disclosed in the following discussion. As stated in the following equation (1), the fault current, If, as a function of time, is approximately $$If \simeq k' (\cos\omega t - \cos\omega t_1) \tag{1}$$

where
$V_{GEN} \simeq \sin \omega t$
$t_1$ = instant of fault
$\omega = 2\pi f_{gen}$
$k'$ = constant (relating to total system + fault impedance).

Important features of the preferred embodiment of the present invention are the simulation of the fault current If including the appropriate offset by means of an operational amplifier and a sample-and-hold circuit. A signal $k'$ (cosωt) is applied to the inverting and noninverting inputs of operational amplifier a, for example. In this configuration, the output of the amplifier equals zero as indicated by equation (2) as follows:

$$Vout(a) = k' (\cos\omega t) - k' (\cos\omega t) = 0 \quad (2)$$

At the instant that a disturbance is recognized on the line, the signal to one of the operational amplifier inputs i.e. input 49 is stopped and held thereafter at the value it had at the time of stoppage $t_1$. Thereafter, the output V'out is stated in equation (3) as follows:

$$V'out(a) = k'\cos\omega t - K'\cos\omega t_1 \quad (3)$$

which is the expression for the high level fault current If. The constant $k'$ is a property of the system, i.e. impedance, in which the breaker is installed and can be input manually at the time of installation. The signal $\cos\omega t$ is obtained from the line voltage V1 prior to the disturbance, for example.

Figure 3:
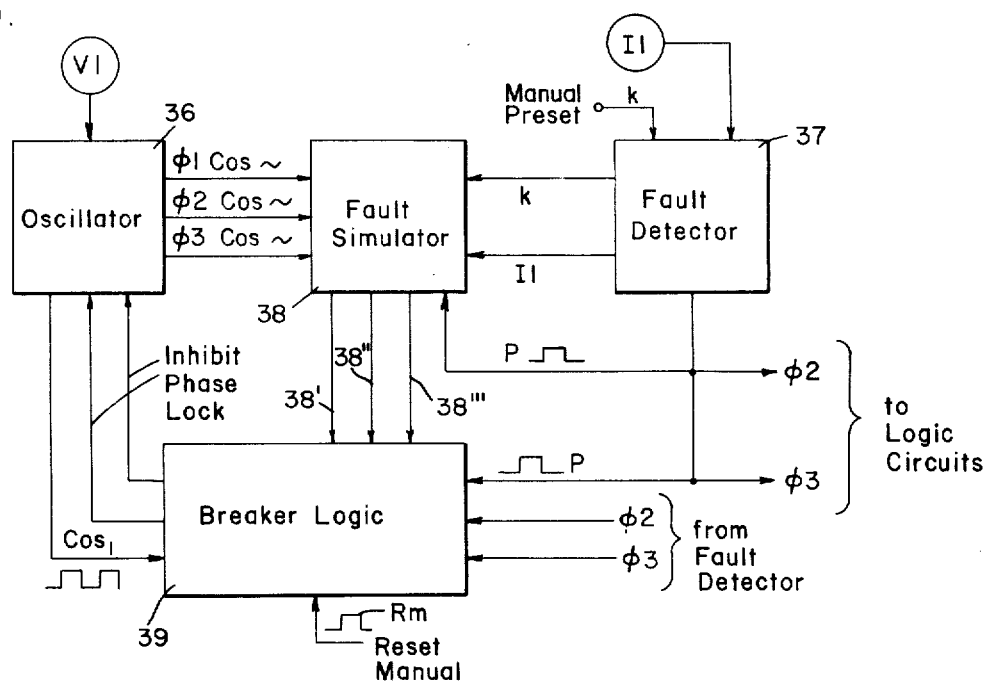
FIG. 3 is a schematic block diagram of the control system for three phases, φ1, φ2, φ3 of the preferred embodiment of the present invention including the controlled current limiting circuit.
Figure 4:
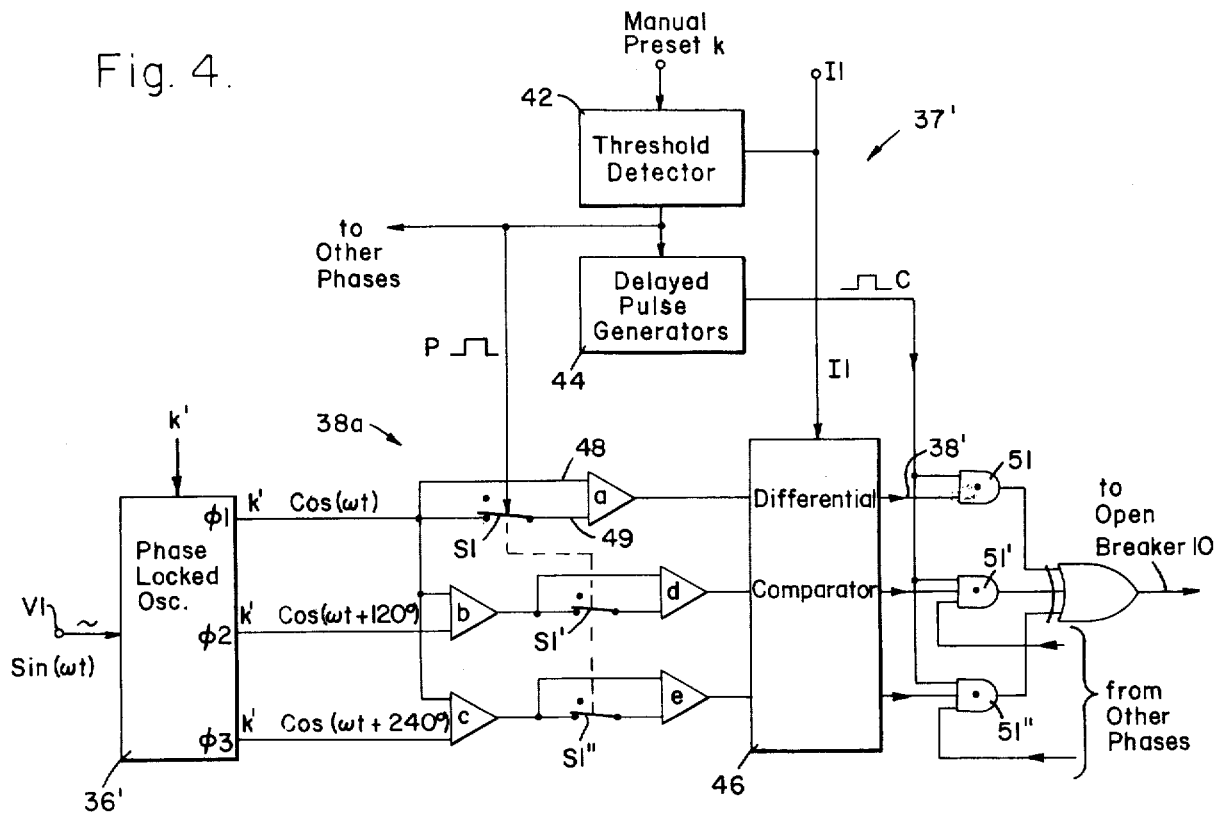
FIG. 4 is a more detailed schematic block diagram of the current limiting control system for three phases φ1, φ2, φ3 of the preferred embodiment of the present invention.

Referring now to FIG. 3 a detailed schematic block diagram is shown for the preferred control system of the invention for one phase $\phi 1$ of a three phase power transmission system. The line voltage V1 is monitored to synchronize a 3-phase oscillator 36, see FIG. 3, whose outputs are in quadrature with the three-line voltages under normal load. The line current I1 is monitored by a preset fault threshold detector 37 in FIG. 3 and 42 in FIG. 4. When the line current I1 exceeds the threshold for a period of time, a digital output is provided to Fault Simulator 38a which opens electronic switch s1 (3PDT). The digital output of detector 42 is coupled to the other two phases for connection as indicated in FIG. 4 for phase 01 by inputs "from other phases." The digital output of detector 42 also actuates a delayed pulse generator 44 which will generate a digital signal, clock C, after a specific period approximating 1 msec.

In the operation of the Fault Simulator 38a (FIG. 4), before fault threshold detection, switch S1 is closed, the analog inputs to operational amplifier (a) are $k'\lambda \cos(\omega t)$ and the output is zero. Amplifiers (b) and (c) each have a gain of $1/\sqrt{3}$. The inputs to amplifier (b) are $k'\cos(\omega t)$ and $k'\cos(\omega t + 120°)$. The output is therefore $k'\cos(\omega t + 150°)$, as set forth in equations (4) and the output of an amplifier (c) as set forth in equations (5).

$$Vout(b) = 1/\sqrt{3}\ (-k'\cos(\omega t) + k'\cos(\omega t + 120°)) \quad (4)$$
$$= 1/\sqrt{3} \cdot \sqrt{3} \cdot k'(\cos(\omega t + 180°) + \cos(\omega t + 120°))$$
$$= k'\cos(\omega t + 150°)$$

Similarly the output of (c) is:

$$Vout(c) = 1/\sqrt{3}\ (-k'\cos(\omega t) + k'\cos(\omega t + 240°)) \quad (5)$$
$$= 1/\sqrt{3} \cdot \sqrt{3} \cdot k'(\cos(\omega t + 180°) + \cos(\omega t + 240°))$$
$$= k'\cos(\omega t + 210°)$$

These are the vector relationships for 2-phase fault currents between the first phase 01 and each of the other two phases $\phi 2$, $\phi 3$.

With switch s1, still closed, the output of operational amplifiers (d) and (e) will be zero along with (a). When switch S1 is opened by the digital output pulse P of the fault threshold detector 42, the values of inputs to the three amplifiers (a), (d) and (e), on one of their respective inputs, are fixed at their instantaneous values. The respective outputs then are indicated in equations (6), (7) and (8):

$$V'out(a) = k'\cos(\omega t) - k\cos(\omega t_1) \quad (6)$$
$$V''out(b) = \sqrt{3}k'(\cos(\omega t + 150°) - \cos(\omega t_1 + 150°)) \quad (7)$$
$$V'''out(c) = \sqrt{3}k'(\cos(\omega t + 210°) - \cos(\omega t_1 + 210°)) \quad (8)$$

These equations simulate the major high-level fault possibilities, respectively, as follows:
a. phase to ground
b. 2 phase ($\phi 1-\phi 2$)
c. 2 phase ($\phi 1-\phi 3$).

These simulations of the critical fault current If, which on a longer term basis, are the limitation of the existing breakers in the system, are compared to the actual line current I1 on a short term basis. A differential comparator 46 makes this comparison. If the time-integral of the actual line current I1 is greater than that of any of the simulations, a digital output is applied to the array of AND gates 51. One input of each gate is a clock or gating pulse C occurring approximately 1 millisecond after the triggering of the Threshold Detector 42, e.g. 900 $\mu$seconds earlier. For the gates 51 which are fed by the two $\phi 1-\phi 2$, $\phi 1-\phi 3$, two-phase simulations, an additional input is the output of the Threshold Detectors 42', 42'' for the relevant phase $\phi 2$, $\phi 3$. The outputs of these three AND gates 51 are applied to an "exclusive OR" gate having an output which trips open the breaker 10. Thus, if at the end of 1 msec, the outputs of the single-phase simulator 38' are produced to indicate a fault current greater than the critical value, or either of the 2-phase simulators provide such an output and the other phase indicates a disturbance, the in-line breaker 10 is opened.

From the description of fault protection in ac power distribution supra, it should be evident that rapid response time of the control circuit to fault currents 33a during t1–t3 is critical in the operation of the protective system. Accordingly, in the preferred embodiment of the invention shown in FIGS. 2 and 3, the 3 phase control system is shown to comprise reference transmission line voltage and current detector circuits V1 and I1 which are coupled to the power distribution lines 32 for $\phi 1$, $\phi 2$, $\phi 3$ in order to continually monitor the 3 phase line currents of $\phi 1-\phi 3$. Voltage signal V1 for 01 is supplied to the Phase-locked Oscillator 36 (FIG. 3) having 3 sine wave outputs $\phi 1\ \cos(\omega t)$, $\phi 2\ \cos(\omega t + 120°)$ and $\phi 3\ \cos(\omega t + 240°)$ that are coupled to Fault Simulator 38 to provide signal voltages to the Simulator 38 for actual zero crossing of the reference phase $\phi 1$ and the presumed zero crossing of the other two phases $\phi 2$, $\phi 3$.

The Fault Simulator receives six inputs including a trip level input signal $k$, line current I1, a fault pulse from $\phi 1$ and the three sine waves indicating zero crossover. When the fault pulse is received, the fault simulator will produce three outputs utilizing trip level $k$ as a starting current and the beginning of the fault pulse as the instant in the cycle at which the fault occurs. The simulator outputs 38', 38'', 38''' are compared to the actual line current for the time period of 1 millisecond in the system of Breaker Logic shown by block 39. The line current I1 is coupled to the fault detector 37 along with a manual preset input $k$ which represents the trip level. The Fault Detectors 37 are responsive to the line currents I1 and k to produce three outputs including the trip level signal k and the line current I1 which signals k and I1 are applied to inputs of the Fault Simulator 38, as indicated supra. The remaining output of Fault Detector 37 is coupled to lines φ2 and φ3 which are outputted to the Breaker Logic circuits shown in FIG. 5. This latter output is also coupled to the Fault Simulator 38 and is in the form of a digital pulse C for clock gating. As shown in FIG. 3, the output of Fault Detector 37 is applied to Breaker Logic, indicated by block 39 to actuate means for interrupting power transmission in response to a fault detection indicated by the gating pulse C in combination with outputs φ1-φ2, φ1-φ3 in the Breaker Logic 39. The Breaker Logic 39 is responsive to inputs from 9 sources. As indicated above, this includes the original fault pulse P, three digital signals of a reference phase φ1, φ2, φ3 which indicate the condition of the line current I1, i.e. whether it has exceeded the simulated current, and the fault pulses phases φ1, φ2, φ3 for a three phase system. In addition the Breaker Logic is responsive to a manual reset signal Rm to re-establish power transmission. In a typical fault current limiting operation, the Breaker Logic decodes the inputs to produce any one of three operations including opening of the in-line device 10, reclosing of the in-line device 10 or inserting the current limiting resistor 22, illustrated in FIG. 2. The remaining two outputs are coupled to the Oscillator 36 in order to disconnect said oscillator from the line voltage reference for 16 cycles after the occurrence of a potential fault. This will prevent the oscillator from varying according to the input line voltage V1. The logic for disabling the discriminator is described more fully in the discussion of FIG. 5.

In the Fault Detection Circuit 37 of the preferred embodiment shown in FIG. 3 each phase requires one current sensor and one voltage reference. The current sensor may be a linear coupler mounted on one bushing of the interruptor. A potential divided may provide the voltage reference signal. As the voltage sensor is not used during faults and high level disturbances, it is unnecessary to maintain the dc component of line voltage since the amplitude of the voltage is not critical as only the zero-crossing information is used. However, it is important that whatever phase differences exist remain constant during operation as these directly affect the accuracy of the zero-crossing data.

Figure 3B:
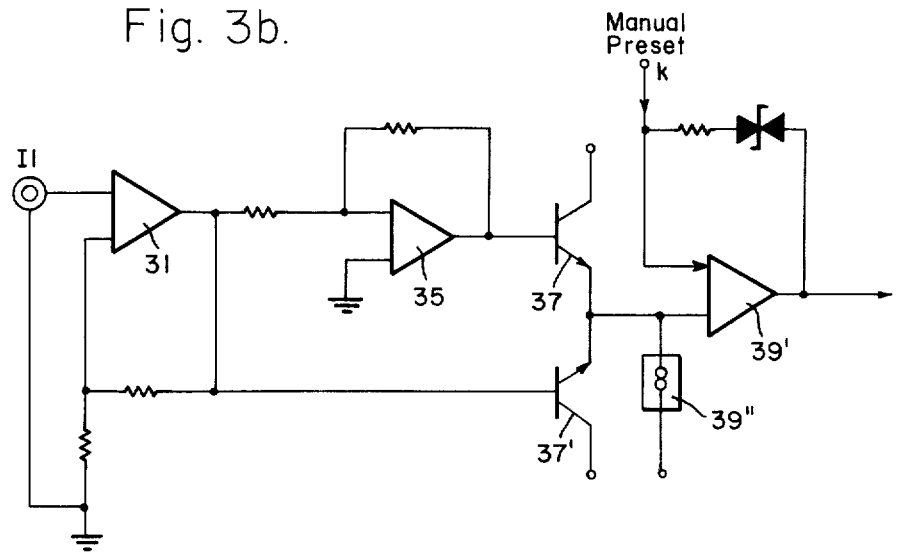
FIGS. 3b and 3c are schematic circuit diagrams of the preferred embodiments of certain blocks of the diagram of FIG. 3.

Referring now to FIG. 3b the Fault Detector 37 of the preferred embodiment initiates current limiter action. The signal I1 received from a linear coupler is amplified by a first operational amplifier 31 to a level where the critical current produces approximately 1 volt output. A second operational amplifier 35 is used as a unity gain inverter. The respective outputs of amplifiers 31, 35 are connected directly to the bases of two emitter-follower transistors whose emitters are connected in parallel through a constant current source 39''. This configuration acts as an absolute magnitude amplifier, that is, the output from the emitter follower tracks the output of the most positive operational amplifier 31 or 35. The net effect is to invert the negative half cycles of the sine wave input. The output appears as a full wave rectified voltage.

This conversion to absolute magnitude is accomplished so that the value of the critical current may be represented by a single positive dc voltage. If the inversion were not accomplished, equalized control voltages, both plus and minus, would be necessary to represent the critical values. The k manual input to the third operational amplifier 39' in the channel receives the trip control input voltage on its inverting input and the output of the absolute magnitude amplifier 39' on its noninverting input. A feed-back loop to the k input from the output of the third operational amplifier 39' incorporates two 7.5 V Zener diodes to provide a clean square-wave output, but avoids saturation of the amplifier 39' for faster response. This square-wave output goes to the other control elements as a positive pulse P of 15 volts magnitude; its duration corresponds to the time that the line current exceeds the present value of the k input. The manual preset critical current k is fed to the fault simulator along with the absolute magnitude of the line current I. The 15 volt logic clock pulse C is fed to the Breaker Logic, the Fault Simulator, and to the controls of the other phases φ2, φ3 as illustrated by block diagram in FIG. 3.

Figure 3C:
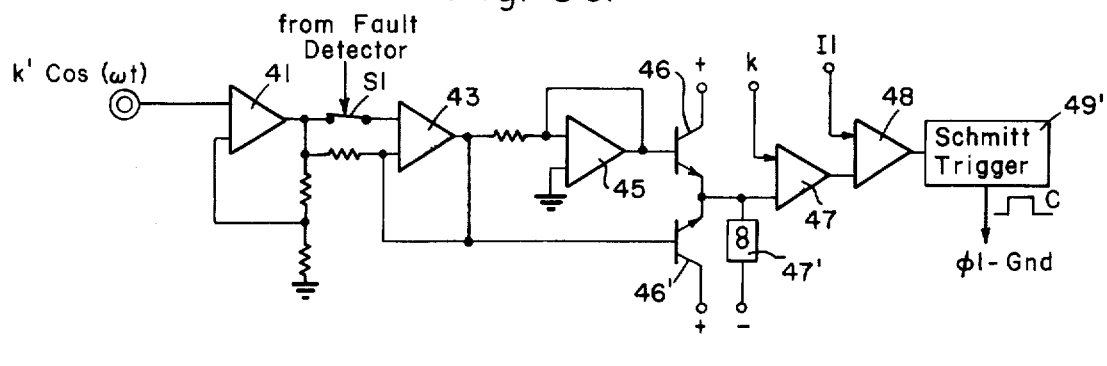
Figure 3C:
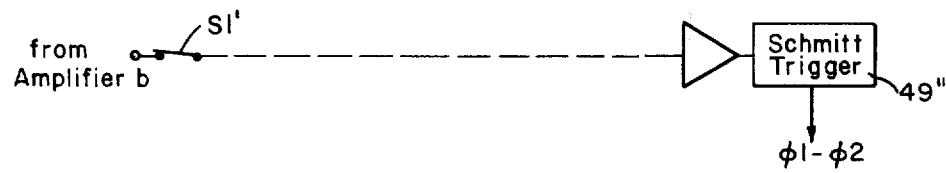
Figure 3C:
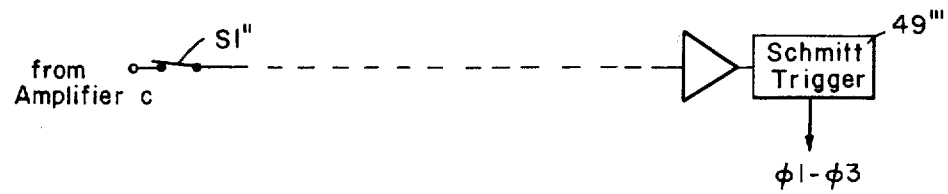

Referring now to FIG. 3c the Fault Simulator 38 of the preferred embodiment consists of three identical circuits which differ only in the configuration of their inputs. The operation is best understood by references to the upper circuit diagram. This circuit simulates the case of a line-to-ground fault for phase φ1.

The first circuit has four inputs: k, I1, the output of the Fault Detector 37; and the output of the Oscillator 36, in quadrature with phase φ1 voltage. There is a single digital output C to the Breaker Logic 39. This output indicates in the 1 condition that a fault greater than acceptable is in process between phase φ1 and ground.

Stating the case mathematically:

Ifault = F(cos ωt − cos ωt₁)

where $t_1$ = initiation time of fault

ω = 2πfgen

F = system impedance factor

To simulate the fault current variation with time requires:

(1) the function cos ωt, (2) a means to store cos ωt, and 3. means to provide the difference between the two quantities.

In normal operation, the high-speed FET switch between the first two operational amplifiers 41, 43 is closed. Thus, the same signal cos ωt is applied to the positive and negative inputs of the second amplifier 43. This signal is well within the common-mode rejection range of the amplifier 43, hence the output of amplifier 43 is zero. When a fault occurs, the switch S1 is rapidly opened by the fault detector signal P. The signal cosθ1 continues on the other input, simulating the ac component of fault current, while the "last value before fault" is held on the switched input by the charge on a small capacitor (not shown) and represents the offset of the fault. Thus, the output of the amplifier 43 simulates the sum of the ac component and the offset.

The third operational amplifier 45 inverts this simulated signal, and two PNP transistors 46, 46' convert it further to "absolute magnitude." The fourth operational amplifier 47 adds an offset k, equal to the trip level, in order to match initial conditions. The resulting reference signal is compared to the absolute magnitude of the actual line current at the input of the fifth operational amplifier 48. The output triggers a pulse generator 49, e.g. Schmitt Trigger, when the integrated difference value is above zero indicating that the line current is greater than the simulated fault current over the observation period.

The simulation of phase-to-phase fault current is accomplished in a similar manner. The sum of two functions F cosθ1 and F cosθ2, obtained with a difference amplifier gives an output which provides the upper phase angle, but which is $\sqrt{3}$ times too large. Since the maximum acceptable fault current is a fixed value independent of whether it flows from one phase to ground or to another phase $\phi 1-\phi 2$, $\phi 1-\phi 3$, the amplitude of the simulated phase-to-phase fault signals must be reduced by $1/\sqrt{3}$ by adjustment of the difference amplifier gain.

Noise immunity of the control system is provided by delayed gating of the Threshold Detector 42 such that disturbances exceeding the threshold for less than approximately 100 μsec will not produce the gating pulse C from Delayed Pulse Generator 44.

In a practical application, there will be a slight time difference between the occurrence of a fault and the time that the current in the line 11 exceeds the preset threshold current value. If this difference is ignored, the fault simulation will start from an incorrect value of current 11. In the preferred control system of the invention, therefore, this difference is provided for by introducing into the simulator the electrical signal k which represents the level of the preset threshold current. This constant k is introduced as an offset in the simulation such that the simulation always begins at the level of current representing the threshold, and an output pulse is produced at the instant of time that the actual line current 11 exceeds that level. In this manner, the time or current difference is provided for in the system of the present invention. Further, if the preset threshold level changes for any reason, the compensation automatically changes as it is controlled by the preset threshold level.

The switches S1, S1', S1", while schematically shown as electromechanical for simplicity, would preferably consist in transistors for switching in response to pulse P and supplied from Schmitt Trigger 49 shown in the detailed schematic of FIG. 3c.

The use of operational amplifiers to provide fault outputs for inputting to Differential Comparator is one of the more important features of the present invention. As noted earlier, digital signal levels 0 to + volts are produced by amplifiers a, d, e in response to pulse P which actuates switches S1, S1', S1" to remove the signal from the negative input of operational amplifiers a, d, e. The unbalanced inputs cause these amplifiers to produce positive outputs.

An alternate approach would require interrogating a read-only memory, for example, to provide a reference for comparison with the actual line current indication in digital form.

Figure 5:
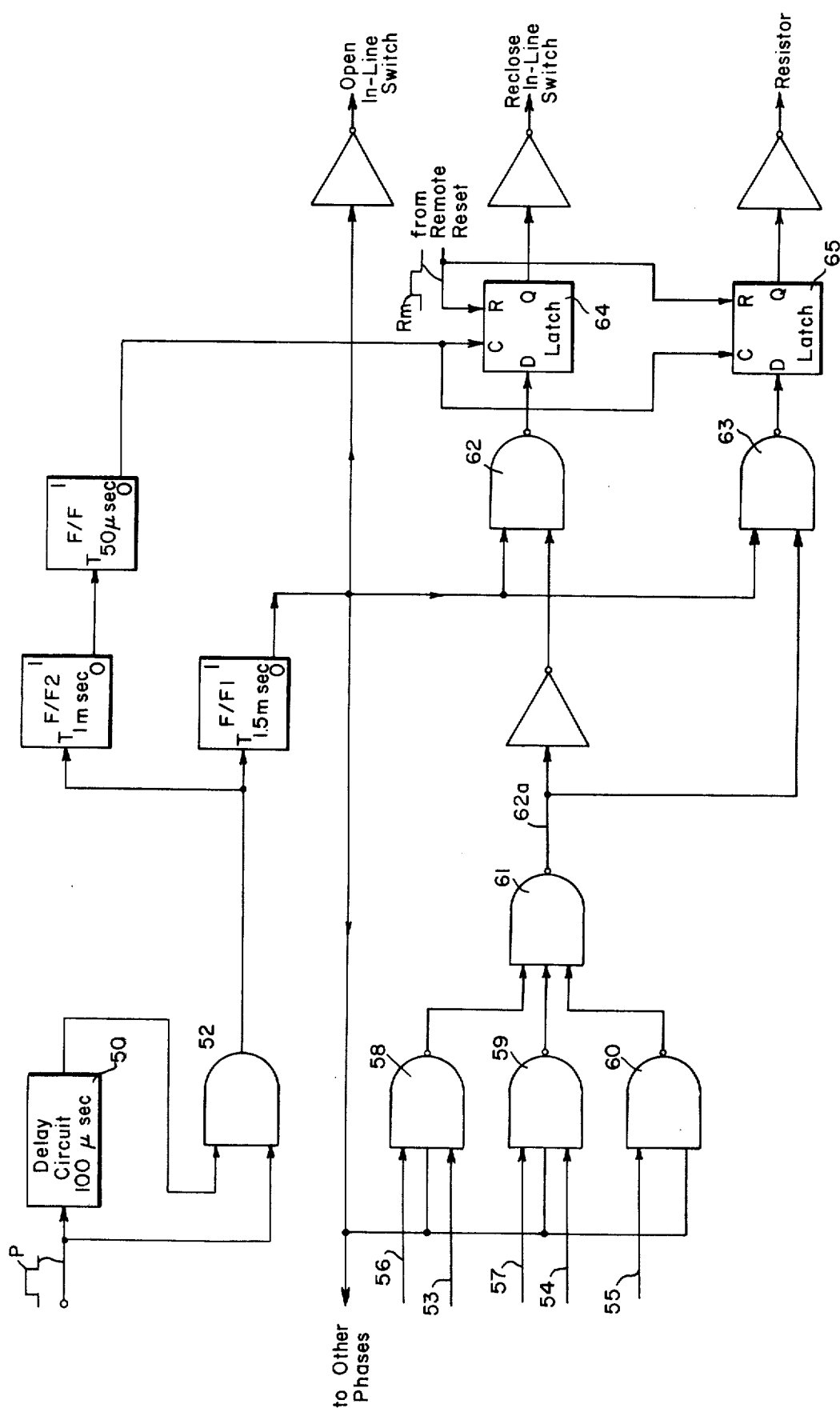
FIG. 5 is a logical circuit providing certain control functions in the system of the present invention.

All circuits of command logic shown in FIG. 5 are digital and provide high threshold logic for noise immunity. The first pulse in a fault sequence to arrive at the Breaker Logic is gating clock pulse P. This positive going pulse clocks a sequence of delay circuits which accurately time the simulation of the critical fault current and the subsequent action taken by the control to either open or close the in-line switch or to complete the opening sequence by inserting the current limiting resistor. The pulse P clocks a latch which is concerned exclusively with the operation of disregarding the reference line voltage for a period of time following the disturbance. The general function is to cut off pulses to block the discriminator output to the master oscillator so that the letter may be free during a disturbance.

The clock gating pulse also initiates a timed sequence of operations. The first of these is a simple determination by circuit 50 and AND gate 52 that the clock pulse endures for at least 100 μsec. This is to ensure that a disturbance of short duration does not initiate the opening sequence of the in-line device. Circuit 50 and circuit 52 are together responsive only to disturbances persisting for more than 100 μsec whereupon the output of 52 changes state and initiates a timing sequence through a chain of monostable multivibrators F/F. The first of these generates a pulse of 1.5 msec duration which is coupled to the controls in the other three phases of the breaker to indicate that phase $\phi 1$ has had a disturbance for more than 100 μsec. The output of the AND gate circuit 52 also triggers a second monostable multivibrator which generates a pulse of 1 msec duration which initiates the opening of the in-line device and times the comparative integration of the Fault Simulator 38 (see FIGS. 3 and 4). The trailing portion of this 1 msec pulse triggers the third monostable multivibrator which clocks the latches that have been tracking the state of the Fault Simulator 38 and initiates reclosure or resistor insertion.

Three fault simulator digital outputs are inputted to the Breaker Logic 39. The input 55 indicates a line-to-ground fault, while the other two inputs 53, 54 represent phase-to-phase faults for the other two phases e.g. $\phi 2$, $\phi 3$. Inputs 56 and 57 are linked together via two NAND gates 58, 59 so that there is no response when a fault is indicated by the phase-to-phase simulation unless the other phase under consideration also indicates a long-term disturbance is underway. The line-to-ground fault condition does not include phase-to-phase and is gated by a pulse on input 55 to NAND gate 60.

The output of all three gates 58, 59, 60 is applied to a three input NAND gate 61. The output 62 feeds two latches 64, 65, through a pair of NAND gates 62, 63 that are gated by the 1.5 msec pulse output of F/F1. The latches 64, 65 are clocked by the termination of the 1 msec pulse output of F/F2. If there is an indication of a fault at the input of the latch, it will initiate resistor insertion. On the other hand, a nonfault input activates reclosure. The latches 64, 65 are reset by a remote reset pulse RM. The reset action initiates reclosing of the in-line device, completing the control cycle.

In the light of the above teachings of the preferred embodiment disclosed, various modifications and variations of the present invention are contemplated and will be apparent to those skilled in the art without departing from the spirit and scope of the invention.

What is claimed is:

1. Power transmission control system comprising in combination:
   sensing means responsive to deviations in a power transmission line and having outputs indicative of a potential fault condition in the line for producing a sample signal in an output thereof corresponding to actual power transmission;
   a fault simulator comprising an oscillator and a switching device;
   means connected to said switching device for actuating said switching device in response to said power line sample signal when the power line sample signal is indicative of a potential fault condition, said fault simulator producing an output which varies in time as the variation in power transmission under an actual fault condition and is in quadrature with the power line voltage;

said fault simulator further comprising a differential amplifier having input circuits connected in parallel to said varying oscillator output in the absence of a fault condition and having one of said differential amplifier inputs disconnected by said switching device from said oscillator and with said input clamped at the potential of the oscillator at the time of disconnection; and circuit means responsive to line and reference signals for comparing said reference and line sample signals, and for producing a fault signal in response to deviation of the line sample signal beyond the reference signal.

2. The power transmission control system according to claim 1 in which said control system further includes a detector for connection to a power transmission line to be responsive to actual power line conditions at the onset of a potential fault condition, said detector being connected as an input to said fault simulator and serving to transmit to said fault simulator a power transmission line signal corresponding to the actual power transmission at said onset of a potential fault condition.

3. The power transmission control system according to claim 2 which further comprises circuit breaker means and breaker logic means each for coupling to said fault simulator for each of a plurality of different phases, said breaker logic means including a logic circuit responsive to signals prior to excessive power dissipation for determining the opening of the breaker means by a phase of power transmission to produce an output to said circuit breaker means for interrupting any phase including any combination of said plurality of phases prior to excessive power dissipation according to the phase of transmission having a fault condition.

4. The power transmission control system according to claim 1 in which said differential amplifiers comprises an operational amplifier having the characteristics of high dc stability and high immunity to oscillation provided by a high degree of negative feedback therein.

5. The power transmission control system according to claim 1 in which said sensing means producing the sample signal indicative of a fault condition includes a threshold detector for producing said sample signal consisting of a digital pulse indicative of the potential fault condition in response to a potential fault load current coupled to said threshold detector.

6. The power transmission control system according to claim 5 which further includes signal delay means having an input and an output and the digital control pulse produced by the threshold detector is applied to input of the signal delay means, said delay means being responsive to the digital control pulse for producing a pulse in its output for gating an output of said circuit means for comparing the reference and the sample signal.

7. Power transmission control system comprising in combination:

sensing means responsive to deviations in a power transmission line and having outputs indicative of a potential fault condition;

a fault simulator comprising an oscillator, a differential amplifier, a switch and circuit means, said oscillator producing an output which varies in time essentially as the transmission line current under an actual fault condition and is essentially in quadrature with the power line voltage, said differential amplifier receiving said output from said oscillator at both input terminals and said switch disconnecting said oscillator outputs from one of said two differential amplifier terminals in response to outputs from said sensing means, said circuit means being attached to said differential amplifier to maintain said switch terminal at the potential of said oscillator at the time of disconnection; and additional circuit means comparing said differential amplifier output which serves as a reference with a sample of the actual line current to provide a breaker trip signal when said sample line current exceeds said reference signal on the average throughout a specified time period.

8. A control system for acting in response to conditions in a power line, said control system comprising:

an oscillator for running essentially in quadrature with line voltage;

a differential amplifier having first and second inputs, said oscillator being connected to said first input of said differential amplifier through a switch and to said second input and means connected to said first input for clamping said first input when said switch is open so that said differential amplifier has an essentially zero output when said switch is closed;

sensing means for connection to the power line for sensing when line current in the power line exceeds a threshold value to indicate a possible fault in the power line, said sensing means being connected to said switch to open said switch when sense line current exceeds threshold value so that when said switch is opened the output of said differential amplifier is a wave in quadrature to line voltage and essentially in synchronism with a fault in inductive conditions and offset in accordance with the phase angle in which threshold was exceeded; and means for comparing the output of said differential amplifier with line current.

9. The system of claim 8 wherein said differential amplifier is a first differential amplifier and said means for comparing is a second differential amplifier having the output of said first differential amplifier connected to the negative input of said second differential amplifier and means is provided for connecting a signal representative of line current to the positive input of said second differential amplifier.

10. The system of claim 9 wherein a threshold detector is connected to the output of said second differential amplifier so that said threshold detector is an output when line current conditions indicate a line fault of sufficient magnitude to warrant potective action.

* * * * *